Aug. 5, 1958     D. G. GRISWOLD     2,845,947
PILOT VALVE

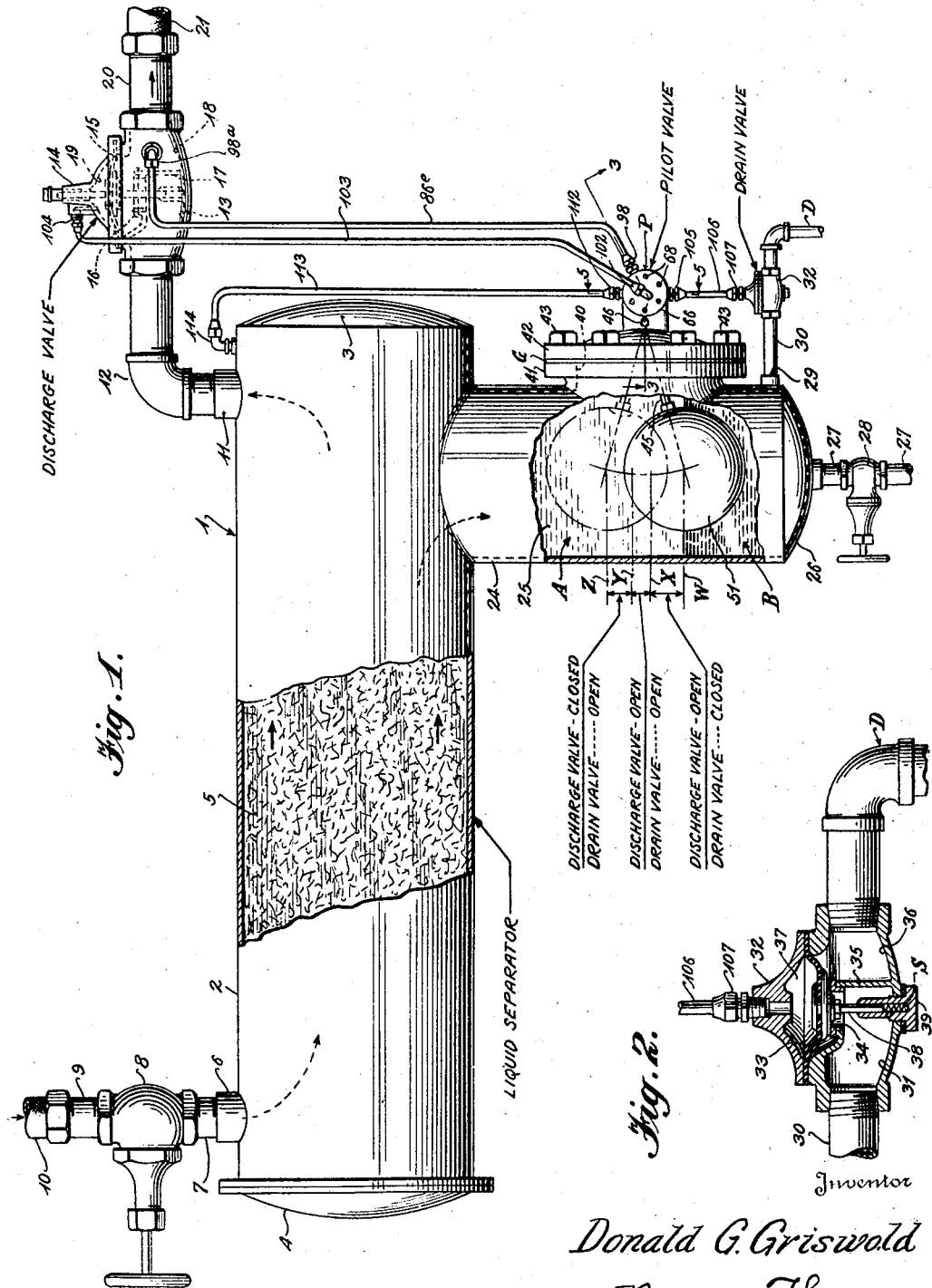

Original Filed Dec. 9, 1944     5 Sheets-Sheet 2

Inventor
Donald G. Griswold
By Bacon & Thomas
Attorneys

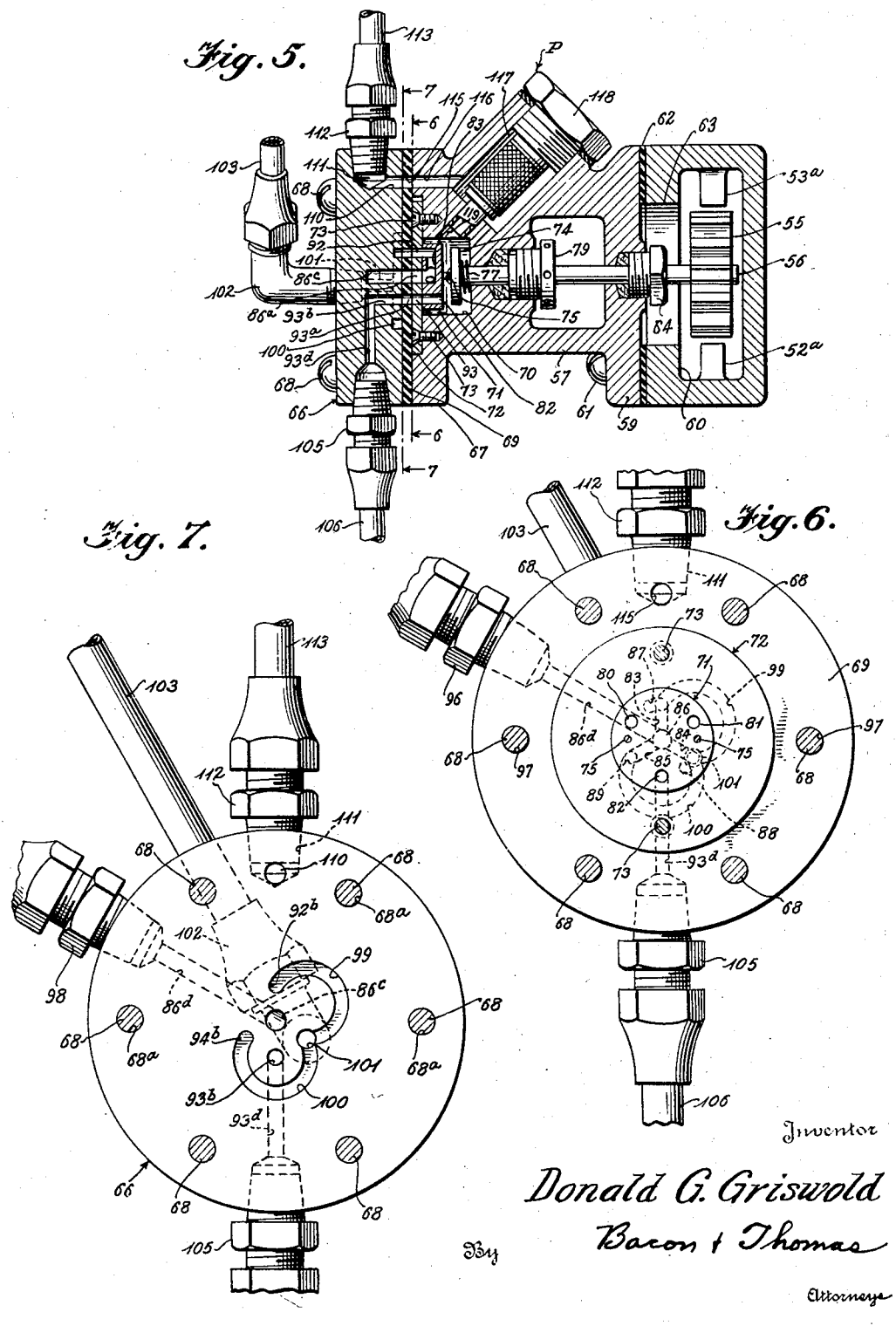

Aug. 5, 1958 D. G. GRISWOLD 2,845,947
PILOT VALVE
Original Filed Dec. 9, 1944 5 Sheets-Sheet 4

Inventor
Donald G. Griswold
By Bacon + Thomas
Attorneys

Aug. 5, 1958 D. G. GRISWOLD 2,845,947
PILOT VALVE

Original Filed Dec. 9, 1944 5 Sheets-Sheet 5

Inventor
Donald G. Griswold
Bacon + Thomas
Attorneys

United States Patent Office 2,845,947
Patented Aug. 5, 1958

2,845,947

PILOT VALVE

Donald G. Griswold, San Marino, Calif.

Original application December 9, 1944, Serial No. 567,442, now Patent No. 2,609,099, dated September 2, 1952. Divided and this application November 8, 1951, Serial No. 255,397

12 Claims. (Cl. 137—624)

This application is a division of my co-pending application Serial No. 567,442, filed December 9, 1944, for Liquid Separation Apparatus, which issued into Patent 2,609,099, dated September 2, 1952.

The present invention relates to apparatus for separating immiscible liquids having different specific gravities, and more particularly to apparatus for separating two liquids, such as, for example, gasoline and water.

The principal object of the invention is to provide an automatic liquid separation apparatus which will effectively separate immiscible liquids having different specific gravities at a high rate of operation.

Another object of the invention is to provide automatic liquid separation apparatus for handling immiscible liquids having different specific gravities, the lighter of which may be highly inflammable, and in which the fire hazard is reduced to a minimum.

Another object of the invention is to provide an automatic, extremely sensitive control means for liquid separation apparatus of the character aforementioned which will avoid discharging the heavy liquid with the light liquid even though an excess of the heavy liquid is suddenly introduced into the apparatus.

Still another object of the invention is to provide automatic liquid separation apparatus which is hydraulically controlled and in which the light liquid is utilized as the operating pressure fluid, but is preferably conserved instead of being discharged to waste.

Still another object of the invention is to provide a liquid separation apparatus for immiscible liquids having different specific gravities, wherein the apparatus consists of a self-contained unit which can be readily transported from one point of use to another.

Briefly, the invention comprises a fluid separation unit including a casing having an inlet into which the mixture of liquids is pumped under pressure; an outlet for the light liquid; and means between the inlet and outlet for effecting gravity separation of the liquids. The separator casing includes means at the lower part thereof providing a sump or chamber in which the heavy liquid is adapted to collect by gravity. A hydraulically operable discharge valve for the light liquid is connected with the outlet of the separator casing and a hydraulically operable drain valve for the heavy liquid is connected to the collecting chamber. A float mechanism is preferably associated with the collecting chamber and includes a float member of such character that it will sink in the light liquid and be buoyantly supported by the heavy liquid. A pilot valve is connected with the float mechanism so that it is actuated in accordance with variations in the level of the heavy liquid. Operating fluid under pressure is preferably and conveniently taken from the upper portion of the separator casing through a supply conduit and delivered to a pressure chamber in the housing of the pilot valve. A first conduit connects the pilot valve with the hydraulically operable (water) drain valve, a second conduit serves as an exhaust conduit and preferably connects the pilot valve with the outlet side of the (gasoline) discharge valve, instead of discharging to waste; and a third conduit connects the pilot valve with the pressure chamber of the discharge valve.

The pilot valve also preferably includes a rotatable ported pilot disc, a ported seat for the pilot disc, and a distribution base, the pilot disc, seat and base having ports and passages arranged so that: (1) when the level of the heavy liquid in the sump or float chamber is low the discharge valve for the light liquid is open and the drain valve for the heavy liquid is closed; (2) when the heavy liquid in the float chamber rises above a predetermined level, both the discharge and drain valves are open; and (3) when the level of the heavy liquid in the float chamber rises above a predetermined maximum, or if a sudden excess of the heavy liquid is introduced into the separator casing so as to suddenly raise the level of the heavy liquid in the float chamber, the discharge valve is immediately closed and the drain valve remains open.

When the unit is employed to separate gasoline and water, the gasoline is utilized as the operating medium for the hydraulically operable discharge and drain valves, but none of the spent operating fluid is lost because, as explained above, it is exhausted through the outlet opening of the discharge valve and thus enters the discharge line to mingle with the gasoline normally flowing through the discharge valve. The use of the light liquid, be it gasoline or some other liquid, as the operating medium for the valves eliminates the necessity for an extraneous source of fluid under pressure, thus making the unit self-contained.

Other objects and features of the invention will be apparent from the following description taken in conjunction with the accompanying drawings, in which:

Figure 1 is a view, partly in section, of an automatic liquid separation apparatus embodying the principles of the present invention;

Figure 2 is an enlarged longitudinal sectional view through the drain valve shown in Figure 1;

Figure 5 is an enlarged vertical sectional view through the pilot valve taken on the line 5—5 of Figure 1;

Figure 6 is a slightly enlarged sectional view through the pilot valve taken on the line 6—6 of Figure 5 and showing the pilot disc, pilot seat, and gasket in elevation;

Figure 7 is a slightly enlarged sectional view taken on the line 7—7 of Figure 5 and showing the fluid distribution base in elevation;

Figure 13:
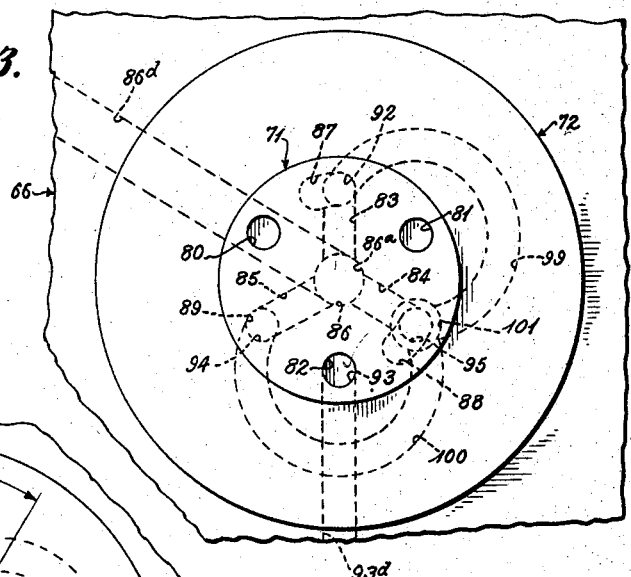
Figure 13 is a diagrammatic view illustrating the position of the pilot disc relative to the pilot seat corresponding to the low position of the float wherein the discharge valve is open and the drain valve is closed.
Figure 15:
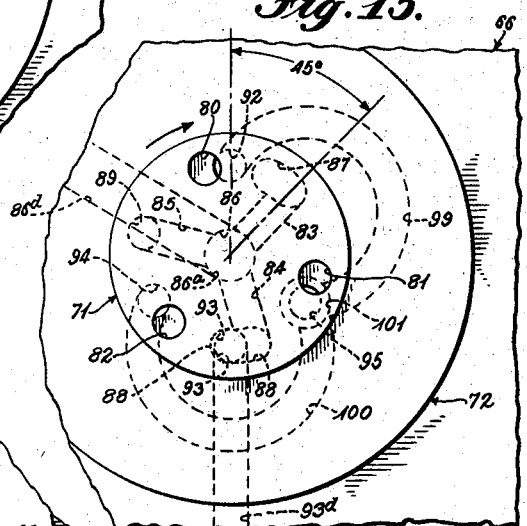
Figure 16:
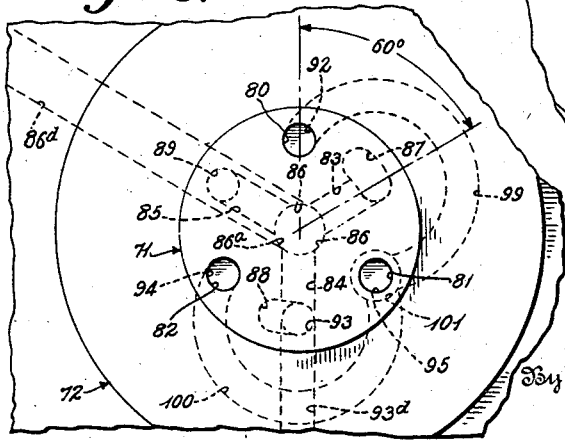

Figure 15 is a view similar to Figure 13 but showing the position of the pilot disc relative to its seat corresponding to another intermediate position of the float wherein the discharge valve is starting to close and the drain valve is open; and Figure 16 is a view similar to Figure 13 showing the position of the pilot disc relative to its seat corresponding to the high position of the float wherein the discharge valve is closed and the drain valve is open.

Referring now to Figure 1 of the drawings, the liquid separation apparatus is generally identified by the numeral 1 and includes an elongated, preferably horizontally disposed, casing 2 closed at one end by a head 3 and closed at its opposite end by a removable cover 4. The casing 2 contains a replaceable filter element 5 of "excelsior" or any other suitable material which is effective as a filtering medium to remove foreign matter from the liquids being separated and which is also effective for producing gravity separation of the immiscible liquids passing through said casing, permitting the liquid of the lower specific gravity to rise and the liquid of the higher specific gravity to pass downwardly to the lowest portion of said casing.

The casing 2 has an inlet 6 in the upper part thereof adjacent the head 4. A pipe nipple 7 has one end thereof threaded into the inlet 6 and its opposite end connected with the outlet of a manually operable supply shut-off valve 8. A pipe nipple 9 has one end thereof threaded into the inlet side of the valve 8 and its opposite end detachably coupled with a supply conduit 10. The supply conduit is adapted to be connected with a source of mixed immiscible liquids, for example, gasoline contaminated with ordinary water, sea water, or other liquid having a greater specific gravity than gasoline. The mixed liquids are introduced into the conduit 10 by a pump (not shown) under sufficient pressure to force the liquids through the separating means 5 at a rapid rate.

The casing 2 is also provided with an outlet 11 in the upper part thereof adjacent the head 3 through which the liquid of lower specific gravity may pass from said casing. The outlet 11 is connected by suitable pipe fittings generally indicated by the numeral 12 with the inlet opening 13 of a hydraulically operable discharge valve 14. The valve 14 includes a diaphragm 15 adapted to engage a seat 16 on a partition 17 separating the inlet opening 13 from the outlet opening 18 of said valve to control the flow between said openings. A pressure chamber 19 is disposed above the diaphragm 15 and is adapted to receive operating fluid under pressure to act upon the upper side of the diaphragm 15 to effect closing of the discharge valve 14, as will be described hereinafter in greater detail. A pipe nipple 20 is connected with the outlet opening 18 of the valve 14 and a detachable discharge conduit 21 has one end thereof coupled with the pipe nipple 20 and its other end arranged to discharge into a storage tank or other suitable receptacle.

The casing 2 is still further provided with a depending cylindrical leg 24 located adjacent the head 3 and arranged to provide a chamber 25 which serves the dual purpose of a float chamber and chamber in which the heavy liquid can accumulate. The leg 24 is open at its upper end and communicates directly with the interior of the casing and the lower end of said leg is closed by a head 26. A pipe 27 having a manually operable valve 28 connected therein extends downwardly from the head 26 and provides means for effecting manual draining of the float chamber 25 and casing 2.

An outlet 29 is provided at the lower end of the leg 24 and one end of a pipe nipple 30 is threaded into said outlet. The opposite end of the pipe nipple 30 is connected with the inlet opening 31 (Figure 2) of a hydraulically operable drain valve 32. The drain valve 32 contains a diaphragm 33 adapted to cooperate with a seat 34 formed upon a partition 35 separating the inlet opening 31 from an outlet opening 36. A pressure chamber 37 is arranged above the diaphragm 33 and is adapted to receive operating fluid under pressure to act upon the upper side of the diaphragm 33 to effect closing of the drain valve 32 in a manner which will be described more fully hereinafter. A stem 38 is suitably connected with the diaphragm 33 and is slidably received in a plug 39 threaded into the bottom of the body of the valve 32. If desired, a spring S may be mounted in the plug 39 in engagement with the lower end of the stem 38 to augment quick opening of the drain valve 32. A drain pipe generally indicated by the letter D is connected with the outlet opening 36 of the valve 32.

The leg 24 of the casing 2 is provided with an opening 40 in the side wall thereof at a point approximately medially of its height. A flange 41 surrounds the opening 40 and a closure plate 42 is arranged in confronting relation to the flange 41 and is secured thereto by a plurality of bolts 43, a gasket G being interposed between the flange 41 and the closure plate 42 to provide a fluid-tight joint. The closure plate 42 is provided with a central hollow projection 44 (Figures 3 and 4) adapted to serve the dual purpose of a support for a float arm 45 and for a pilot valve generally identified by the letter P. The float arm 45 is pivotally mounted at a point intermediate its ends upon any suitable pivot, for example, a pin 46. The pin 46 extends through an opening 47 in the float arm 45 and has an enlarged portion 48 threadedly mounted in an opening 49 formed in the projection 44. Packing material 50 is disposed in the enlarged portion of the opening 49 around the pin 46 to provide a fluid-tight seal between said pin and the projection 44. A ball float 51 (Figure 1) is secured to one end of the float arm 45 and is of such weight that it will sink in the light (lighter specific gravity) liquid A but will be buoyantly supported by the heavy (greater specific gravity) liquid B. The diameter of the float 51 is such that it will readily pass through the opening 40 at the time the closure plate 42 is mounted upon the leg 24.

Figure 4:
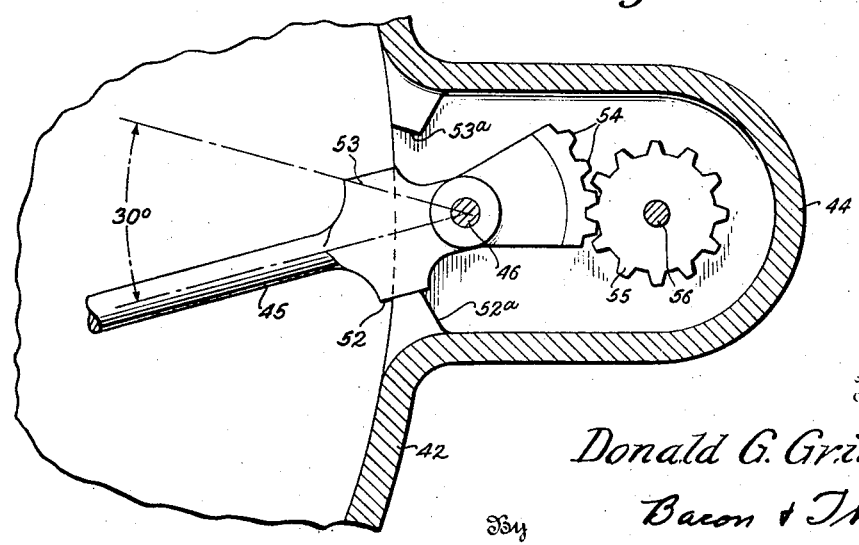
Figure 4 is a fragmentary sectional view taken on the line 4—4 of Figure 3 illustrating the driving connection between the float arm and pilot valve.

The float arm 45 is designed to rotate through an angle of approximately 30°, as indicated in Figure 4. Downward angular movement of the float arm 45 is limited by the engagement of a lug 52 on the arm 45 with a stop 52ª, and upward angular movement of said float arm is limited by the engagement of a lug 53 carried by said float arm with a stop 53ª.

Figure 3:
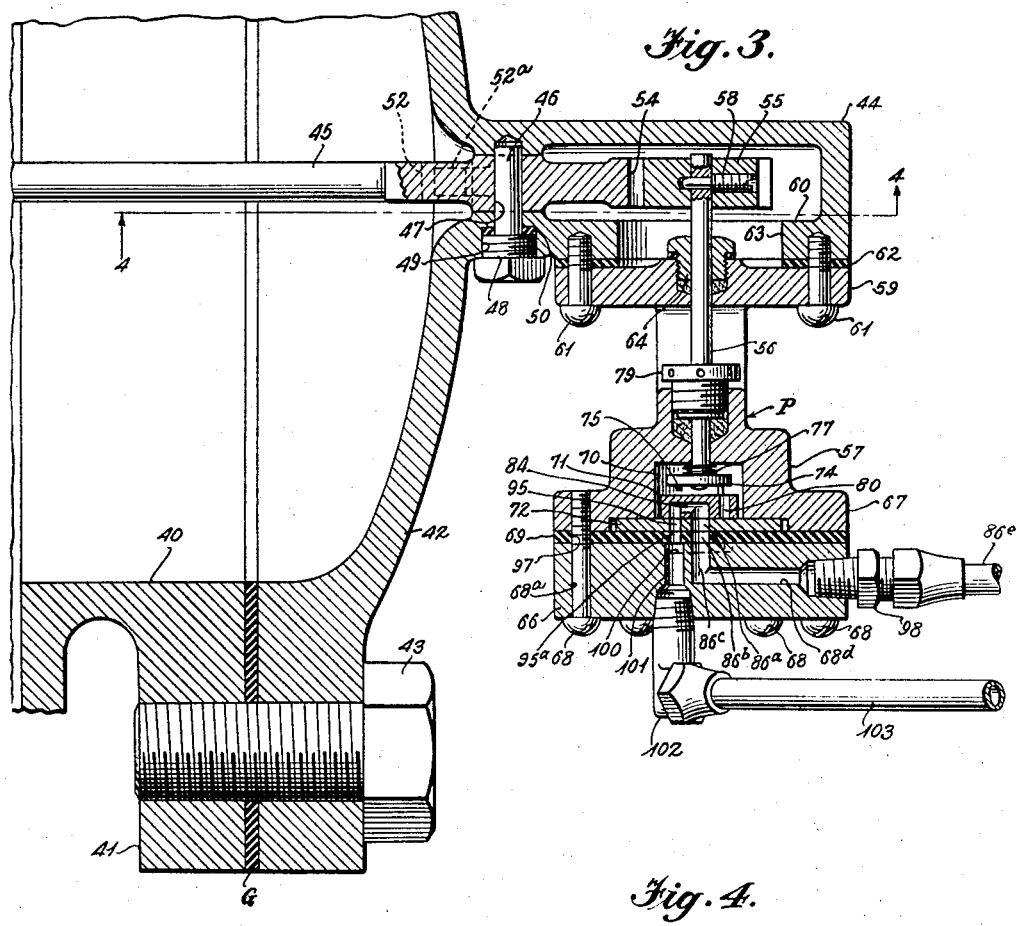
Figure 3 is an enlarged sectional view through the pilot valve and float chamber taken on the line 3—3 of Figure 1.

The opposite end of the float arm 45 is conveniently provided with a plurality of teeth 54 which mesh with the teeth of a pinion 55 carried by one end of a pilot drive shaft 56. The pilot drive shaft 56 projects outwardly beyond one end of a pilot valve housing 57 and the pinion 55 is secured to the projecting end of said shaft by a screw pin 58 (Figure 3). As indicated in Figure 4, the total angular movement of the float arm 45 is through an angle of about 30°. The pitch circle of the teeth 54 on the float arm 45 is equal to twice the radius of the pitch circle of the teeth of the pinion 55 so that for a total angular movement of 30° of the float arm 45, the pinion 55 will rotate the shaft 56 connected with a pilot disc through an angle of 60°, which corresponds to the angular spacing of the ports of said pilot disc, as will appear later.

The pilot valve housing 57 has a flange 59 which is secured to one side wall 60 of the hollow projection 44 by a plurality of screws 61. A gasket 62 provides a leak-proof seal between the housing 57 and the hollow projection 44. The side wall 60 has an opening 63 through which the pinion 55 is adapted to be inserted to mesh with the teeth 54 on the float arm 45. Leakage around the shaft 56 from the interior of the projection 44 is prevented by a suitable stuffing box 64 mounted in the flange 59.

The pilot valve P includes a fluid distribution base 66, which is secured to a flange 67 of the pilot valve housing 57 by a plurality of screws 68, a gasket 69 being interposed between the flange 67 and the base 66 to prevent leakage.

The pilot valve housing 57 has a chamber 70 adapted to receive operating fluid under pressure. A rotatable pilot disc 71 is disposed in the pressure chamber 70. The pilot disc 71 engages a seat 72 mounted in a recess formed in the flange 67, one side of the seat 72 being engaged by the gasket 69. A plurality of screws 73 (Figure 5) secure the seat 72 to the pilot valve housing 57 in such manner that the seat forms a closure for one end of the pressure chamber 70. The pilot drive shaft 56 extends inwardly into the pressure chamber 70 and carries a drive washer 74 at the inner end thereof provided with a pair of pins 75 adapted to be received in recesses 76 (Figures 8 and 10) formed in the pilot disc 71. A spring 77 is interposed between the drive washer 74 and the adjacent end wall of the pressure chamber 70 and tends to urge the pilot disc 71 into engagement with its seat 72. Leakage around the drive shaft 56 from the pressure chamber 70 is prevented by a stuffing box 79.

Figure 8:
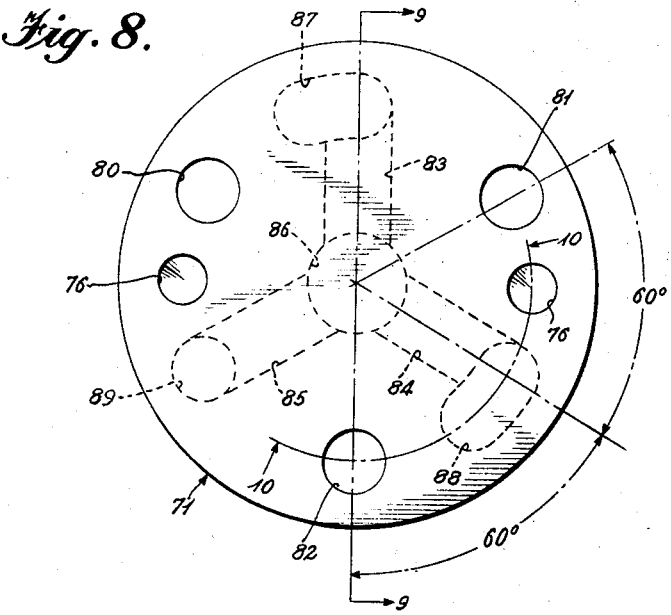
Figure 8 is a greatly enlarged view of the pilot disc.
Figure 9:
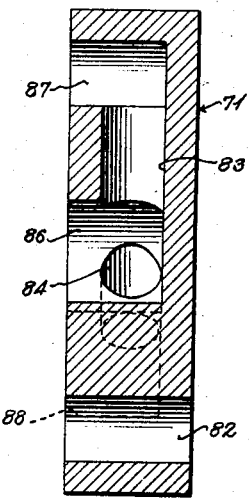
Figure 9 is a sectional view through the pilot disc taken on the line 9—9 of Figure 8.
Figure 10:
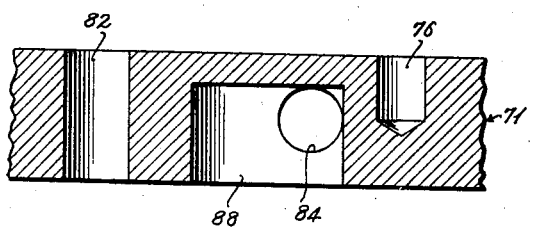
Figure 10 is a fragmentary sectional view taken on the line 10—10 of Figure 8.

The pilot disc 71 is best illustrated in Figures 8, 9 and 10. As is here shown, the pilot disc 71 includes three through or pressure ports 80, 81 and 82. The pilot disc 71 also includes three generally U-shaped exhaust ports 83, 84 and 85, all of which terminate at their inner ends in a common enlarged axial port 86. The exhaust ports 83 and 84 terminate at their outer ends in elongated ports 87 and 88, respectively, while the exhaust port 85 terminates in a circular port 89. It will be noted that the elongated port 87 extends counterclockwise relative to the exhaust port 83, and that the elongated port 88 extends clockwise relative to the exhaust port 84. The object of the elongated ports 87 and 88 is to effect certain overlapping actions of the valves 14 and 32, as will be set forth in detail later. The pressure ports 80, 81 and 82 are arranged upon radii 120° apart and the exhaust ports 83, 84 and 85 are also arranged upon radii 120° apart with the exhaust ports respectively disposed between two adjacent pressure ports so that the individual ports are spaced only 60° apart.

Figure 11:
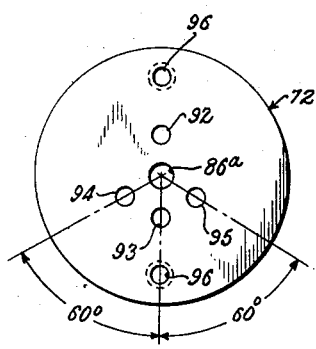
Figure 11 is an elevational view of the pilot seat drawn to the same scale as Figure 6.

The pilot disc seat 72 is best illustrated in Figure 11. It will be noted from this figure that the seat 72 is provided with an axial port 86$^a$ adapted to register at all times with the axial port 86 of the pilot disc 71. The seat 72 is also provided with relatively smaller first and second ports 92 and 93, respectively, arranged upon a diametrical line passing through the center of the axial port 86$^a$. The seat 72 is further provided with third and fourth ports 94 and 95, respectively, with the ports 94 and 95 disposed upon radii extending 60° to either side of the diametrical line passing through the ports 92 and 93. The seat 72 has countersunk openings 96 adapted to receive the heads of the screws 73 mentioned hereinbefore. The ports 92 to 95 of the seat 72 are, of course, located the same radial distance from the axis of the seat as the pressure ports 80, 81 and 82 and the outer ports 87, 88 and 89 of the exhaust ports 83, 84 and 85 of the pilot disc, so that the ports of the pilot disc can be selectively brought into registration with the seat ports to effect simultaneous control of the discharge valve 14 and the drain valve 32.

Figure 12:
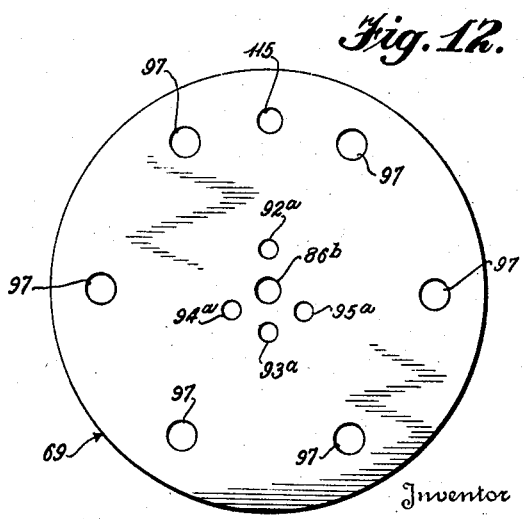
Figure 12 is a view of the gasket which is interposed between the pilot valve housing and the fluid distribution base, drawn to the same scale as Figure 6.

The gasket 69 is best illustrated in Figure 12 and is provided with an axial port 86$^b$ which continuously registers with the axial port 86$^a$ in the seat 72, and ports 92$^a$, 93$^a$, 94$^a$ and 95$^a$ which are in continuous registration with the ports 92 to 95, respectively, of said seat. The gasket 69 also has a series of openings 97 and the fluid distribution base has a corresponding series of openings 68$^a$ through which the bolts 68, supra, extend.

The ports and passages of the fluid distribution base 66 are best illustrated in Figure 7. The base 66 is provided with an axial port 86$^c$ which continuously registers with the port 86$^b$ of the gasket 69. Thus, the axial port 86 of the pilot disc 71 is in continuous communication with the port 86$^a$ in the seat 72, the port 86$^b$ in the gasket 69, and the port 86$^c$ in the base 66. A radial passageway 86$^d$ extends outwardly from the port 86$^c$ and its outer end is enlarged and threaded for the reception of a conventional fitting 98; one end of an exhaust tube or conduit 86$^e$ (Figure 1) being connected with the fitting 98 and the opposite end of said conduit preferably being connected by a conventional fitting 98$^a$ with the outlet opening 18 of the discharge valve 14 instead of discharging to the atmosphere.

The face of the fluid distribution base 66 disposed adjacent the gasket 69 is routed to provide two arcuate channels 99 and 100, respectively. One terminal 92$^b$ of the channel 99 is aligned with the first port 92 of the seat 72. Similarly, the channel 100 has a terminal 94$^b$ which is aligned with the third port 94 of the seat 72. The channels 99 and 100 merge at their opposite terminals in an enlarged port 101, which is threaded at its outer end (Figure 3) for the reception of a conventional fitting 102. One end of a tube or conduit 103 is connected with the fitting 102 and the opposite end of said conduit is connected by a fitting 104 (Figure 1) with the valve 14 so that said conduit communicates with the pressure chamber 19 of said valve. The port 101 is conveniently aligned with the fourth port 95 of the seat 72. Thus, the terminal 92$^b$, the port 101 and the terminal 94$^b$ have the same angular spacing as the ports 92, 95 and 94 of the seat 72, namely 120° apart.

The base 66 is also provided with a port 93$^b$ which registers with the port 93 in the seat 72 and communicates with a radial passage 93$^d$ which is enlarged and threaded at its outer end for the reception of a conventional fitting 105. One end of a conduit 106 (Figure 1) is connected with the fitting 105 and the opposite end of said conduit is connected by a fitting 107 with the drain valve 32 so that said conduit communicates with the pressure chamber 37 (Figure 2) of said valve.

The fluid distribution base 66 also has a port 110, see Figure 5, which communicates with a passage 111 having a conventional fitting 112 mounted therein. One end of a supply tube or conduit 113 is connected with the fitting 112 and the opposite end of said supply conduit is connected by a conventional fitting 114 (Figure 1) to the casing 2 at a point adjacent the outlet 11 so that said conduit communicates with the upper portion of the interior of said casing. The gasket 69 has a port 115 in registration with the port 110, and the pilot valve housing 57 has a passage 116 registering with the port 115. The passage 116 communicates with a chamber 117 containing a strainer 118 discharging through passage 119 into the pilot pressure chamber 70. Thus, the supply conduit 113 interconnects the upper part of the casing 2 with the pressure chamber 70 so that operating fluid under pressure for the valves 14 and 32 is always available.

The present liquid separation unit 1 is particularly well adapted for separating ordinary water and/or sea water from high octane gasoline while said gasoline is being pumped out of a tanker, storage tank, or other receptacle directly into a fuel tank of an airplane, combat tank, truck, etc., or into a storage receptacle for uncontaminated gasoline. The unit 1 is preferably mounted upon a motor vehicle (not shown) so that it can be conveniently transported from one place of use to another.

The unit illustrated in Figure 1 as an operative example of the invention, has a capacity of eighty gallons per minute under a pumping pressure of about twenty pounds per square inch. The discharge valve 14 is a one-and-one-half inch valve and the drain valve 32 is a three-eighths-inch valve capable of draining at least five gallons of water per minute, which is in excess of the usual maximum contamination of gasoline by water found under actual operating conditions. It will be understood that the capacity of the unit may be varied as desired by using separator casings 2 of different size and that the size of the valves 14 and 32 may be correspondingly varied.

While reference has been specifically made herein to the separation of gasoline from water, it will be understood that the invention is not limited to such use and that it is capable of separating any two immiscible liquids having different specific gravities.

In operating the unit 1 as a gasoline-water separation apparatus, the conduit 10 will be connected with a suitable supply pump, not shown, for forcing the liquid to be filtered and separated through the casing 2. At such time, the manually operated inlet valve 8 is open and the manually operated drain valve 28 is closed. As the mixture of water and gasoline passes through the casing 2, the mass of "excelsior" 5 will effect gravity separation of the water from the gasoline as the liquids pass from the inlet 6 to the outlet 11. The gasoline A, since it has the lower specific gravity, will discharge through the outlet 11, while the water B, having the greater specific gravity, will collect in the float chamber 25. Of course, gasoline A will be present in the float chamber 25 above any water B that may accumulate therein.

As has been previously pointed out, the lowermost position of the ball float 51 is determined by the engagement of the float arm lug 52 with the stop 52$^a$. Assuming that the height of the water B in the float chamber 25 is below the level indicated by the line W and the lug 52 is engaged with the stop 52$^a$, the pilot disc 71 will be positioned relative to its seat so as to maintain the drain valve 32 closed and the discharge valve 14 open. The relationship of the ports in the pilot disc 71 with respect to the ports in the seat 72 at such time is diagrammatically illustrated in Figure 13. Thus, the pressure port 82 of the pilot disc 71 is in registration with the port 93 in the seat 72 so that operating fluid under pressure can pass directly from the pressure chamber 70 of the pilot valve housing, through the port 82 in the pilot disc, the port 93 in the seat 72, the port 93$^a$ in the gasket 69 into the port 93$^b$ and passage 93$^d$ in the fluid distribution base 66, and thence through the conduit or tube 106 into the pressure chamber 37 of the water drain valve 32 so that hydraulic pressure is effective upon the upper side of the diaphragm 33 to maintain said water drain valve closed. On the other hand, the exhaust passageways 83, 84 and 85 of the pilot disc 71 are in registration with the ports 92, 95 and 94, respectively, of the seat 72 so that spent operating fluid from the diaphragm chamber 19 of the gasoline discharge valve 14 can pass from said chamber to the outlet opening 18 of said valve as follows: The pressure of the gasoline being forced through the unit 1 is effective upon the under side of the diaphragm 15 so that spent operating fluid is forced out of the chamber 19, through the conduit 103 and into the port 101 in the fluid distribution base 66 and is distributed through the channels 99 and 100 from whence it flows into the exhaust passageway 83, 84 and 85 in the pilot disc 71 and into the axial port 86 of said pilot disc, then through the port 86$^a$ in the seat 72, the port 86$^b$ in the gasket 69, thence into the port 86$^c$ and passageway 86$^d$ in the fluid distribution base 66, and finally through the exhaust conduit 86$^e$ into the outlet opening 18 of the valve 14.

The water drain valve 32 will remain closed and the discharge valve 14 will remain open so long as the height of the water B in the float chamber 25 lies between the planes indicated by the lines W and X. When the water level has risen above the plane X, the float arm 45 will have moved through an angle sufficient to effect rotation of the pilot disc 71 clockwise to one of its intermediate operative positions, such as is diagrammatically illustrated in Figure 14. The pilot disc 71 is here shown as having been rotated through an angle of about 30°. It will be noted that the pressure port 82 is now out of registration with the port 93 in the seat so that the supply of operating fluid under pressure to the pressure chamber 37 of the water drain valve 32 is cut off, and that the elongated port 88 of the exhaust port 84 partially overlies the port 93 so that spent operating fluid can be exhausted from the pressure chamber 37 of the water drain valve 32 through the conduit 106. The spent operating fluid from the water drain valve 32, of course, passes through the axial port 86 of the pilot disc 71 and passes through the exhaust conduit 86$^e$ to the outlet opening 18 of the valve 32 in the same manner described in connection with the exhaust from the pressure chamber 19 of the gasoline discharge valve 14. It will also be noted that the elongated port 87 of the exhaust port 83 is still in communication with the port 92 of the seat 72 so that the pressure chamber 19 of the gasoline discharge valve 14 is also open to exhaust. Hence, the gasoline discharge valve 14 and water drain valve 32 are now both open.

Should the water level in the float chamber 25 continue to rise to the level indicated by the line Y, the pilot disc 71 will have been further rotated in a clockwise direction to the position indicated in Figure 15, said figure indicating the position of the pilot disc upon rotation through an angle of about 45° from its initial position. It will be noted that the elongated port 88 of the exhaust port 84 is still in registration with the port 93 of the seat 72 so that the water drain valve 32 continues to remain open. However, the elongated port 87 of the exhaust port 83 no longer registers with the port 92 of the seat 72, but on the other hand the pressure ports 80, 81 and 82 now are in partial registration with the seat ports 92, 95, and 94, respectively, so that operating fluid under pressure is introduced into the channels 99 and 100 of the base 66 and passes through the port 101 and conduit 103 into the pressure chamber 19 of the gasoline discharge valve 14 to effect flexing of the diaphragm 15 toward valve closing position.

Should the height of the water B in the float chamber 25 continue to rise until it reaches the plane indicated by the line Z or reaches a height above said plane, or should a sudden excess volume of water enter said float chamber, the ball float 51 will reach its maximum position of upward movement and the lug 53 on the float arm 45 will engage the stop 53$^a$ to rotate the pilot disc 71 in a clockwise direction to complete its total angular movement of 60° from its initial position shown in Figure 13, so that said pilot disc assumes the position diagrammatically indicated in Figure 16. The exhaust port 84 of the pilot disc 71 still communicates with the seat port 93 so that the water drain valve 32 continues to remain open. On the other hand, the pressure ports 80, 81 and 82 of the pilot disc 71 are now in full registration with the seat ports 92, 95 and 94, respectively, so that a rapid flow of operating fluid to the diaphragm chamber 19 of the gasoline discharge valve 14 occurs to effect quick closing of said valve to thereby positively prevent the discharge of water through the valve 14. The operating fluid under pressure is, of course, conducted to the pressure chamber 19 through the conduit 103, so that said conduit serves the dual purpose of admitting and exhausting operating fluid from the pressure chamber of the gasoline discharge valve 14.

Figure 14:
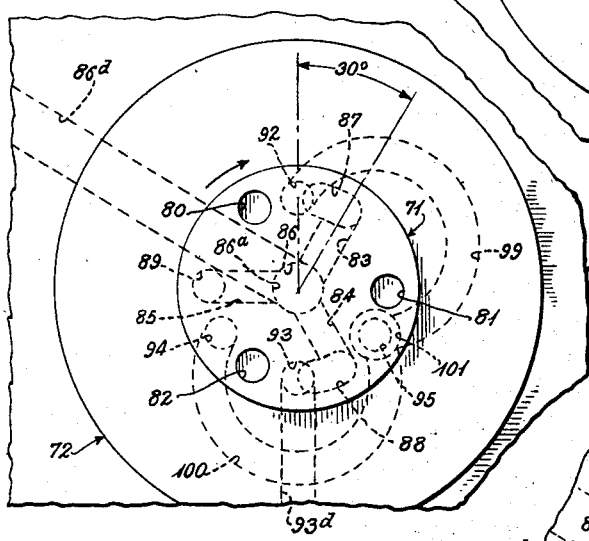
Figure 14 is a view similar to Figure 13 but showing the position of the pilot disc relative to its seat corresponding to an intermediate position of the float wherein both the discharge valve and the drain valve are open.

When the height of the water B in the float chamber 25 drops to a level below the line Y, the pilot disc 71 will assume the intermediate position shown in Figure 14 and the gasoline discharge valve 14 will then open. The water drain valve 32 is open and will remain open until the water level in the float chamber 25 drops to a point below the line X, whereupon the pilot disc 71 will assume a position in which the pressure port 82 of the pilot disc 71 overlaps the seat port 93 and the water drain valve 32 will start to close.

During normal operation, the water drain valve 38 will open automatically, intermittently, to drain excess water B as it accumulates in the float chamber 25. Of course, if very little water is mixed with the gasoline, the drain valve 38 will remain closed until enough water accumulates in the float chamber 25 to raise the float 51 to actuate the pilot valve P to effect opening of said drain valve. It will be understood that the pilot disc 71 will be shifted instantly from the position of Figure 13 (discharge valve 14 open and drain valve 32 closed) to the position of Figure 16 (discharge valve 14 closed and drain valve 32 open) upon the sudden introduction of an excess volume of water into the float chamber 25, and thus preclude the discharge of water with the gasoline under abnormal conditions.

Extremely sensitive operation of the gasoline water separation apparatus is effected at all times by having the float chamber 25 in direct communication with the casing 2 so that there is no restriction in flow between the two. Such arrangement requires the float to operate the pilot in exact accord with variations in the volume of water separated from the gasoline. Great sensitivity of operation is also effected by the use of a pilot valve having a small disc requiring very little force to rotate the same. This makes it possible for the pilot valve to be rotated through an angle corresponding directly to the variations in the water level in the float chamber due to the fact that the buoyant effect of the water in the float chamber has practically no friction to overcome in raising the float to actuate the pilot valve. The extreme sensitivity of operation, aforesaid, is essential to effect a rapid and complete separation of the gasoline from the water.

It will be understood that various changes may be made in the details of construction of the liquid separation apparatus disclosed herein, and in the details of the control means provided for automatically and simultaneously controlling the operation of the discharge and drain valves, without departing from the spirit of the invention or the scope of the annexed claims.

I claim:

1. A pilot valve, comprising: a rotatable ported pilot disc having three pressure ports extending therethrough from side to side, and three substantially U-shaped, radial, exhaust ports terminating at one end in a common axial leg with all legs of said exhaust ports opening on the same side of said pilot disc and with one of said exhaust ports disposed between each two adjacent pressure ports so that the pressure and exhaust ports are disposed upon radii 60° apart.

2. A pilot valve, comprising: a rotatable ported pilot disc having three pressure ports extending therethrough from side to side, and three substantially U-shaped, radial, exhaust ports terminating at one end in a common axial leg with all legs of said exhaust ports opening on the same side of said pilot disc and with one of said exhaust ports disposed between each two adjacent pressure ports so that the pressure and exhaust ports are disposed upon radii 60° apart, at least one of said exhaust ports being circumferentially elongated at its outer end relative to the radial portion thereof.

3. A pilot valve, comprising: a rotatable ported pilot disc having three pressure ports extending therethrough from side to side, and three substantially U-shaped, radial, exhaust ports terminating at one end in a common axial leg with all legs of said exhaust ports opening on the same side of said pilot disc and with one of said exhaust ports disposed between each two adjacent pressure ports so that the pressure and exhaust ports are disposed upon radii 60° apart, two of said exhaust ports being circumferentially elongated at their outer ends in opposite directions relative to the radial portions thereof.

4. A pilot valve, comprising: a housing containing a pressure chamber for operating fluid under pressure; a rotatable ported pilot disc in said pressure chamber, said pilot disc having three pressure ports extending therethrough and three substantially U-shaped, radial, exhaust ports terminating at one end in a common axial leg and with one of said exhaust ports disposed between each two adjacent pressure ports; a seat at one end of said pressure chamber engaged by said pilot disc, said seat having an axial port, a first and second port arranged upon opposite sides of said axial port and upon a diametrical line passing through said axial port, and two additional ports constituting third and fourth ports arranged one upon each side of said second diametrical port; and means for rotating said pilot disc to register the ports of said disc with said seat ports in various relations.

5. A pilot valve, comprising: a housing containing a pressure chamber for operating fluid under pressure; a rotatable ported pilot disc in said pressure chamber, said pilot disc having three pressure ports extending therethrough and three substantially U-shaped, radial, exhaust ports terminating at one end in a common axial leg and with one of said exhaust ports disposed between each two adjacent pressure ports, two of said exhaust ports being circumferentially elongated at their outer ends; a seat at one end of said pressure chamber engaged by said pilot disc, said seat having an axial port, a first and second port arranged upon opposite sides of said axial port and upon a diametrical line passing through said axial port, and two additional ports constituting third and fourth ports arranged one upon each side of said second diametrical port; and means for rotating said pilot disc to register the ports of said pilot disc with said seat ports in various relations.

6. A pilot valve, comprising: a housing containing a pressure chamber for operating fluid under pressure; a seat at one end of said pressure chamber; a rotatable ported pilot disc in said pressure chamber having one face thereof engaged with said seat, said pilot disc having three pressure ports spaced 120° apart extending therethrough and three substantially U-shaped, radial, exhaust ports spaced 120° apart terminating at one end in a common axial leg and with one of said exhaust ports disposed medially between each two adjacent pressure ports, said seat having an axial port, a first and second port arranged upon opposite sides of said axial port and upon a diametrical line passing through said axial port, and two additional ports spaced 120° apart constituting third and fourth ports arranged equi-angularly one upon each side of said second diametrical port; and means for rotating said pilot disc through a maximum angle of 60° relative to said seat.

7. A pilot valve as defined in claim 6, in which at least one of the exhaust ports is circumferentially elongated at its outer end.

8. A pilot valve housing containing a pressure chamber for operating fluid under pressure; a rotatable, ported pilot disc in said pressure chamber; means operatively connected with said pilot disc for effecting rotation thereof, said pilot disc having three pressure ports and three substantially U-shaped, radial, exhaust ports terminating at one end in a common axial port and with one of said exhaust ports disposed between each two adjacent pressure ports so that the pressure and exhaust ports are disposed upon radii 60° apart; a seat engaged by said pilot disc, said seat having an axial port aligned with said axial port of said pilot disc, a first and second port arranged upon opposite sides of said axial port and upon a diametrical line passing through said axial port, and two additional ports constituting third and fourth ports arranged one upon each side of said second diametrical port on radii disposed at an angle of 60° to said diametrical line; and a fluid distribution base arranged upon the side of said seat remote from that engaged by said pilot disc, said fluid distribution base having an axial port in registration with said axial port of said seat, two channels formed in the face thereof nearest said seat with the terminals of the respective channels arranged upon radii 120° apart, one terminal of one of said channels being in registration with the first of said diametrical ports of said seat and one terminal of the other of said channels being in registration with the third port of said seat, the remaining terminals of said channels merging at a point in registration with the fourth port of said seat, said fluid distribution base having a passage communicating with said channels, and an additional port registering with said second diametrical port of said seat.

9. A pilot valve, comprising: a housing containing a pressure chamber for operating fluid under pressure; a rotatable ported pilot disc in said pressure chamber, said pilot disc having three pressure ports extending therethrough and three substantially U-shaped, radial, exhaust ports terminating at one end in a common axial leg and with one of said exhaust ports disposed between each two adjacent pressure ports; and a seat engaged by said pilot disc, said seat having an axial port, a first and second port arranged upon opposite sides of said axial port and upon a diametrical line passing through said axial port, and two additional ports constituting third and fourth ports arranged one upon each side of said second diametrical port, said pilot disc having a first operative position in which the exhaust ports of said pilot disc are in registration with the first, third and fourth ports of said seat, and in which position one of the pressure ports of said pilot disc is in registration with the second port of said seat; a second operative position in which an exhaust port of said pilot disc is in registration with the first and second ports of said seat; and a third operative position in which the pressure ports of said pilot disc are in registration with the first, third and fourth ports of said seat and in which position one of the exhaust ports of said pilot disc is in registration with the second port of said seat.

10. A pilot valve as defined in claim 9, in which two of the exhaust ports of the pilot disc have circumferentially elongated portions at the outer ends thereof.

11. A pilot valve as defined in claim 10 in which the elongated port of one of the two exhaust ports extends clockwise therefrom, and the elongated port of the other of said two exhaust ports extends counter-clockwise therefrom.

12. A pilot valve, comprising: a housing containing a pressure chamber for operating fluid under pressure; a rotatable ported pilot disc in said pressure chamber, said pilot disc having three pressure ports, and three substantially U-shaped, radial, exhaust ports terminating at one end in a common axial leg and with one of said exhaust ports disposed between each two adjacent pressure ports so that the pressure and exhaust ports are disposed upon radii 60° apart; a seat engaged by said pilot disc, said seat having an axial port, a first and second port arranged upon opposite sides of said axial port and upon a diametrical line passing through said axial port, and two additional ports constituting third and fourth ports arranged one upon each side of said second diametrical port on radii disposed at an angle of 60° to said diametrical line; and a fluid distribution base arranged upon the side of said seat remote from that engaged by said pilot disc, said fluid distribution base having an axial port in registration with said axial port of said seat, two channels formed in the face thereof nearest said seat with the terminals of the respective channels arranged upon radii 120° apart, one terminal of one of said channels being in registration with the first of said diametrical ports of said seat and one terminal of the other of said channels being in registration with the third port of said seat, the remaining terminal of said channels merging at a point in registration with the fourth port of said seat, said fluid distribution base having a passage communicating with said channels, and an additional port registering with said second diametrical port of said seat, said pilot disc having a first operative position in which the exhaust ports of said pilot disc are in registration with the first, third and fourth ports of said seat and the channels of said fluid distribution base, and in which position one of the pressure ports of said pilot disc is in registration with the second port of said seat; a second operative position in which an exhaust port of said pilot disc is in registration with the first and second ports of said seat; and a third operative position in which the pressure ports of said pilot disc are in registration with the first, third, and fourth ports of said seat and the channels of said fluid distribution base, and in which position one of the exhaust ports of said pilot disc is in registration with the second port of said seat.

References Cited in the file of this patent

UNITED STATES PATENTS

| | | |
|---|---|---|
| 1,971,767 | Caserta | Aug. 28, 1934 |
| 2,042,186 | Peterson | May 26, 1936 |
| 2,193,720 | Griswold | Mar. 12, 1940 |
| 2,328,008 | Griswold | Aug. 31, 1943 |
| 2,410,876 | Griswold | Nov. 12, 1946 |
| 2,594,576 | May | Apr. 29, 1952 |